Apr. 24, 1923.
F. A. KAUFMANN
SOFT COLLAR SUPPORTER
Filed July 15, 1921
1,453,144
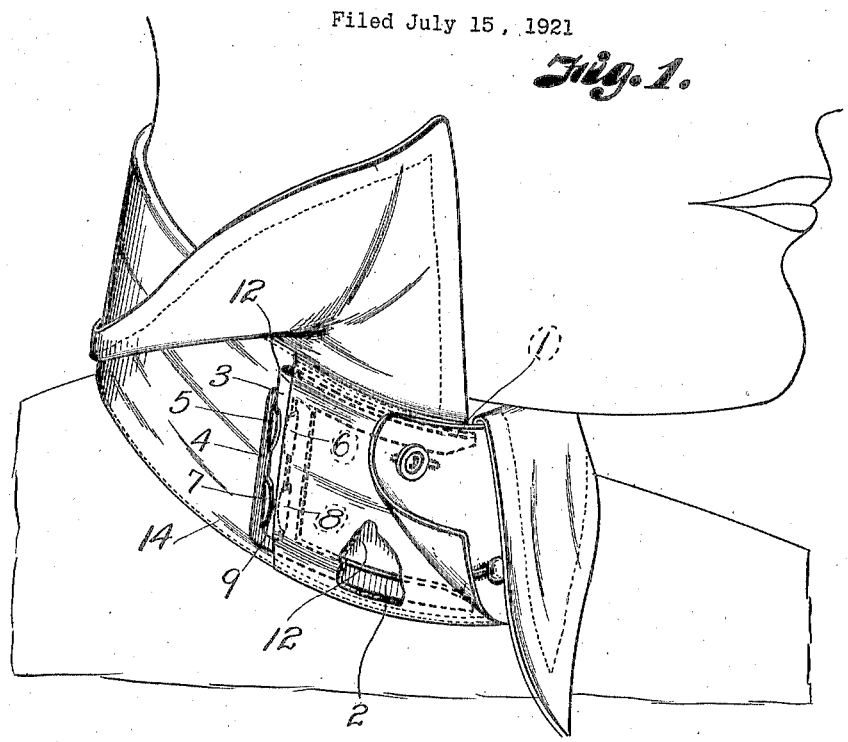
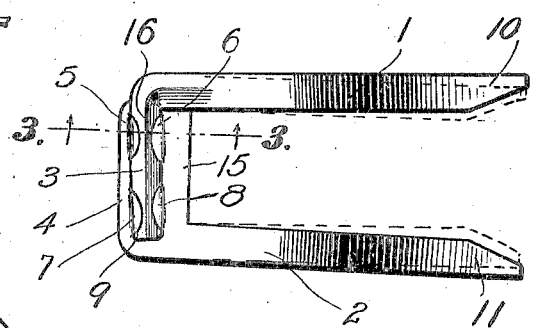
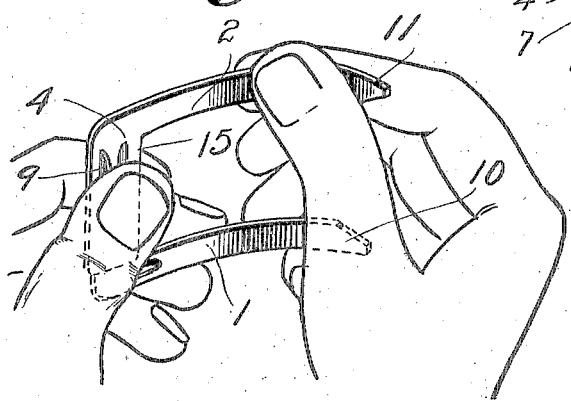
INVENTOR
Florence A. Kaufmann
BY
ATTORNEY Patented Apr. 24, 1923.

1,453,144

UNITED STATES PATENT OFFICE.

FLORENCE A. KAUFMANN, OF KANSAS CITY, MISSOURI, ASSIGNOR TO W. A. HILL, OF KANSAS CITY, MISSOURI.

SOFT-COLLAR SUPPORTER.

Application filed July 15, 1921. Serial No. 484,926.

*To all whom it may concern:*

Be it known that I, FLORENCE A. KAUFMANN, a citizen of the United States, residing at Kansas City, in the county of Jackson and State of Missouri, have invented certain new and useful Improvements in Soft-Collar Supporters; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to soft collar supporters and one of the objects of the invention is to provide a durable collar supporter which may be easily attached to and detached from the collar and when in attached position, provide means for efficiently supporting the front of the collar to preserve its shape and prevent sagging thereof.

Another object of the invention is to provide means for adjusting the supporter vertically to accommodate collars of different heights.

It is also the purpose of my invention to provide a collar supporter having arms at the top and bottom, and which is constructed of material having inherent flexibility without resiliency, the material being such that the arms can be bent on different arcs for different size collars and to permit the collar to lie closely against the neck of the wearer, the arms maintaining their shape after being curved until the curvature is changed by manual operation.

It is also the purpose of the invention to provide a supporter adapted to be easily attached to existing types of collars without changing the construction of the collars.

The novel features of the invention will be specifically described hereinafter, reference being had to the accompanying drawings, in which—

Fig. 1 is a perspective view of a collar applied, showing the collar supporter in functional position.

Fig. 2 is a side elevational view of a collar supporter constructed in accordance with my invention.

Fig. 3 is a cross sectional view on the line 3—3 of Fig. 2 looking in the direction of the arrows, and Fig. 4 is a perspective view of the collar supporter, showing the manner of curving the blades.

The invention is shown as consisting of two arms 1 and 2, the arms having right angular extensions 3 and 4 respectively. The extension 4 for the bottom arm 2 is shown as having cut-out lips 5, 6, 7 and 8 to provide a slot 9, arranged at an obtuse angle to the arm 2 and the slot is adapted to receive the extension 3 of the arm 1, which may be adjustable therein to vary the space between the arms 1 and 2 to provide for collars of different heights.

By arranging the slot 9 at an obtuse angle to the arm 2 and introducing the extension 3 thereinto, the arms 1 and 2 will be normally held in diverging relation; that is, there will be a wider space between the ends 10 and 11 than at the connecting points of the arms.

When the arms are introduced into the pocket, slot or recess 12 of the collar 14, their free ends 10 and 11 will be drawn together to assume the position shown in dotted lines in Fig. 2 so as to slightly teeter the extension 3 and cause it to bind against the edges of the slot 9 so that liability of relative movement between the extensions 3 and 4 when the supporter is in place will be eliminated. The frictional engagement between the extension 3 and the edges of the slot 9 will be increased by the tension of the two arms 1 and 2 when they are drawn together and, therefore, there can be no relative movement until the supporter is withdrawn from the collar.

The supporter will preferably be constructed of some suitable flexible material which will permit the arms 1 and 2 to be bent laterally on arcs to conform to the contour of the neck of the wearer, the material being non-resilient so that the arms will maintain their shapes until again bent to conform to the curve of a different arc.

Attention is called to the fact that the extension or short arm 4 of the arm 2 is of sufficient width to provide a base against which the tie bears so that there will be a tendency to exert pressure on the inner edge 15 of the short arm 4 and swing the free ends 10 and 11 of the supporting frame close to the neck of the wearer and thereby more efficiently preserve the shape of the collar, particularly at the top edge thereof, this being an important feature since the action of the supporting frame will insure the collar lying close to the front of the throat and preserve a neat appearance.

In order to stiffen the arm 1 I provide an L-shaped corrugation 16, which preferably runs the length of the extension 3 and a short distance on the bar 1, as shown in Fig. 2. The purpose of the L-shaped corrugation is to offer enough resistance to the compression when induced by the chin of the wearer pressing against the bar so that liability of the bar collapsing at the angle of the connection with the extension 3 will be eliminated.

It will be apparent, therefore, that a device constructed in accordance with my invention may be easily attached to and detached from a collar, that it may be readily adjusted to suit collars of different heights since the supporting frame consisting of the arms 1 and 2 and the connections is extensible and retractible, and that the device can be constructed by stamping the parts so that the finished product will be inexpensive to manufacture.

What I claim and desire to secure by Letters Patent is:

1. A soft collar supporter having two arms, each having a right angular extension, one extension having a slot at an obtuse angle to the major portion of its arm and adjustably receiving the extension on the other arm.

2. A soft collar supporter comprising an upper L-shaped bar member and a lower L-shaped bar member, each having right angularly disposed arms, the arms of the respective members being adjustably connected, one of said bar members having a corrugation providing a reinforcing rib.

3. A soft collar supporter comprising an upper L-shaped bar member formed by connected arms at right angles one to the other and a lower L-shaped bar member formed by connected arms at right angles one to the other, the arms of the respective members being adjustably connected, one of said bar members having a corrugation providing a reinforcing rib, the reinforcing rib extending substantially the length of the short arm of said one of the bar members and continuing around the angle onto the long arm of said one of the bar members whereby the angle of connection between the short and long arm of said one of the bar members will be reinforced.

4. A soft collar supporter comprising two members, each member consisting of a substantially horizontal arm and a substantially vertical extension at one end thereof, the vertical extensions overlapping and in frictional engagement one with the other, the friction being increased by the free ends of the arms being moved slightly together when the supporter is in functional position.

In witness whereof I affix my signature.

FLORENCE A. KAUFMANN.